United States Patent [19]
Challener et al.

[11] 4,356,089
[45] Oct. 26, 1982

[54] RECOVERY OF OIL

[75] Inventors: Ronald T. Challener, Christchurch; George H. Rolls, Fordingbridge, both of England

[73] Assignee: Oil Mop (U.K.) Limited, Dorset, England

[21] Appl. No.: 203,487

[22] Filed: Nov. 3, 1980

[30] Foreign Application Priority Data

Nov. 6, 1979 [IE] Ireland ................................. 2128/79

[51] Int. Cl.³ .............................................. C02F 1/40
[52] U.S. Cl. ................................. 210/242.4; 210/924
[58] Field of Search ............... 210/671, 242, 923, 924, 210/242.4

[56] References Cited

U.S. PATENT DOCUMENTS

| | | | |
|---|---|---|---|
| 3,662,891 | 5/1972 | Headrick | |
| 3,688,506 | 9/1972 | Marcocchio | |
| 3,695,451 | 10/1972 | Schmirt et al. | 210/924 |
| 3,709,369 | 1/1973 | Brill et al. | 210/924 |
| 3,744,638 | 7/1973 | Rhodes | 210/924 |
| 3,747,760 | 7/1973 | Ekdahl | 210/923 |
| 3,847,816 | 11/1974 | DiPerna | |
| 3,990,975 | 11/1976 | McLellan | |
| 3,998,060 | 12/1976 | Pacus | 210/923 |
| 4,006,082 | 2/1977 | Irons | 210/923 |
| 4,052,313 | 10/1977 | Roll | 210/924 |
| 4,146,477 | 3/1979 | Challener | 210/924 |

FOREIGN PATENT DOCUMENTS

| | | |
|---|---|---|
| 1226836 | 3/1971 | United Kingdom . |
| 1314737 | 4/1973 | United Kingdom . |
| 1314738 | 4/1973 | United Kingdom . |
| 1355460 | 6/1974 | United Kingdom . |
| 1372561 | 10/1974 | United Kingdom . |
| 1438670 | 6/1976 | United Kingdom . |

OTHER PUBLICATIONS

New Scientist, Jul. 31, 1980.

Primary Examiner—Ivars C. Cintins
Attorney, Agent, or Firm—Birch, Stewart, Kolasch & Birch

[57] ABSTRACT

Oil is removed from water surfaces by advancing a continuous loop of oil adsorbent material past the front of a boom which is moving relative to the water to accumulate oil ahead of it and then through an oil desorbing means. The invention also provides a method of and apparatus for removing oil in which the loop is advanced through a floating rope guide means and then through a desorbing means on a vessel towing the guide means by flexible connecting members which keep slack the runs of rope loop between the vessel and the guide means.

14 Claims, 9 Drawing Figures

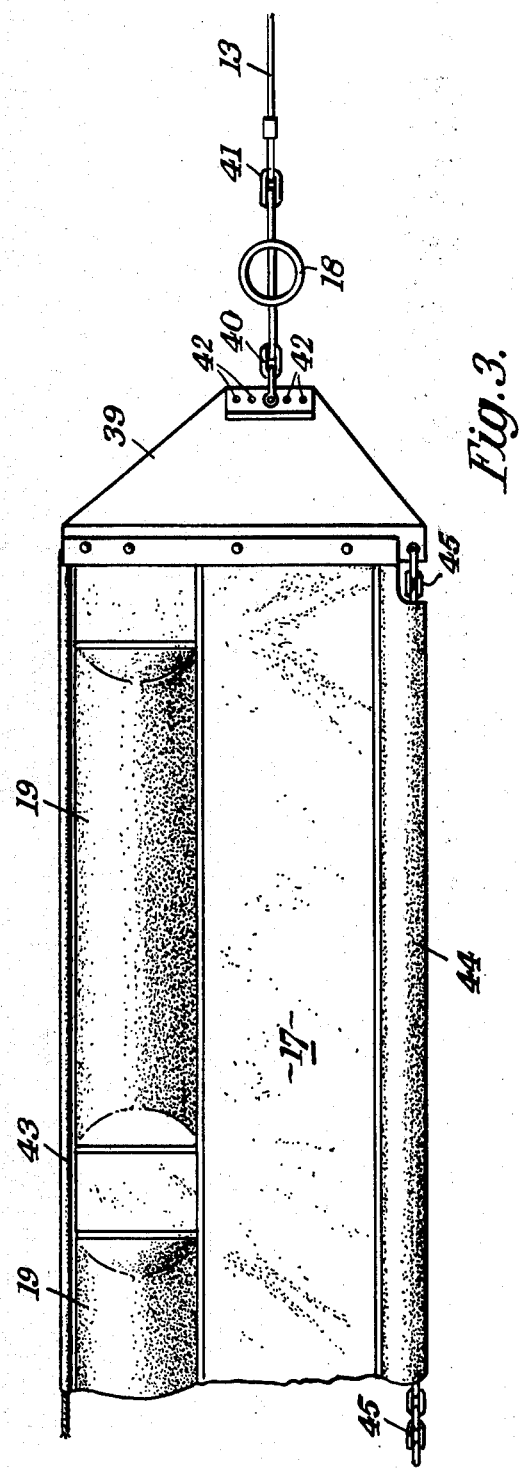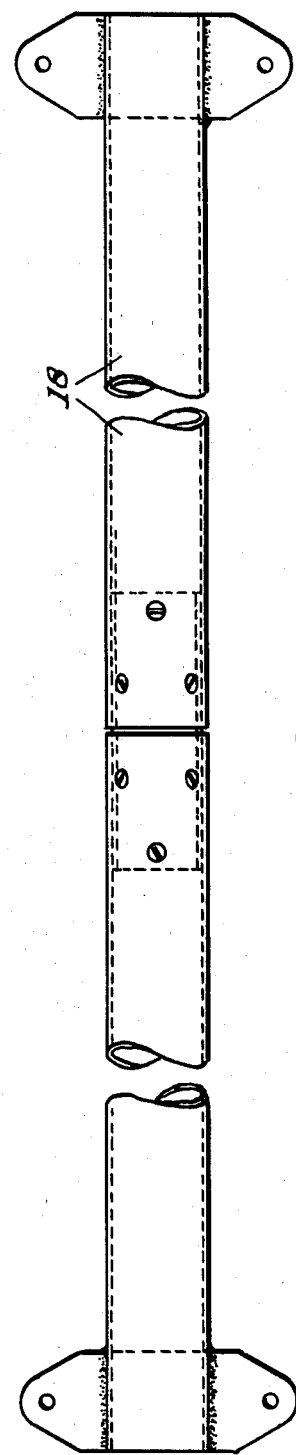

RECOVERY OF OIL

BACKGROUND OF THE INVENTION

This invention relates to methods of, and apparatus for, the recovery of oil from the surfaces of bodies of water contaminated by oil.

It has hitherto been proposed to remove floating oil from a body of water by use of skimmers or a weir. Examples of such proposals are to be found in the specifications of U.S. Pat. Nos. 3,847,816; 3,688,506; and 3,662,891 and United Kingdom Pat. Nos. 1,438,670, 1,355,460 and 1,226,836. While skimmers and weirs can function satisfactorily in bodies of still water such as settling tanks, they are less satisfactory when operating on marine waters where the surface is not flat.

One proposal for oil recovery in marine waters is that of International Patent Application No. PCT/GB79/00128 published under No. WO 80/00355 in which use is made of a material which adsorbs oil in preference to water and a desorbing means to desorb oil from the material. The use of such a material is also described in United Kingdom Patent Specifications Nos. 1,540,220, 1,314,737 and 1,314,738 and U.S. Pat. Nos. 4,052,313, 4,146,477 and 3,990,975.

SUMMARY OF THE INVENTION

The present invention aims to provide a method of using an adsorbent material as mentioned above adapted to recover oil from such locations as sea water harbours and river estuaries. In such circumstances a high rate of oil recovery is required from apparatus which can be maneuvered readily within relatively confined water areas. In this respect it represents an improvement over the prior art proposals some of which operate in the open sea on a scale which is too large, others operate on too small a scale and others function insufficiently well in the sea conditions found in harbours and estuaries.

According to a first aspect of the present invention, there is provided a method of removing oil from the surface of a body of water contaminated with oil in which use is made of a continuous loop of a rope of a material which adsorbs oil in preference to water and a desorbing means to desorb oil from the loop, and which method comprises floating on the surface of the body of water a barrier to the movement of oil on the surface, providing relative movement between the barrier and the body of water to accumulate oil in front of the barrier, positioning the loop so that it extends through the area in front of the barrier and through the desorbing means, and driving the rope so that successive portions of its length are advanced through the area in front of the barrier to adsorb oil on to its surface and thereafter through the desorbing means to desorb oil from its surface.

According to a second aspect of the present invention there is provided an apparatus for use in the removing oil from the surface of a body of water contaminated with oil comprising a barrier to the movement of oil on the surface of the body of water and rope guide means associated with the barrier to guide a rope of a material which adsorbs oil in preference to water, the apparatus being suitable for floating on the surface of the body of water and for movement relative to the body of water thereby to accumulate oil in front of the barrier, whereby, in use of the apparatus, a loop of the rope is driven so that successive portions of its length are advanced through the area in front of the barrier to adsorb oil on to its surface and thereafter through a desorbing means to desorb oil from its surface.

Also provided, according to a third aspect of the present invention, is an apparatus according to the second aspect of the invention in combination with a loop of a rope of the oil adsorbent material and means for driving the rope and for desorbing oil from it.

Preferably, the rope guide means associated with the barrier is such that it is adapted for use with more than one loop of oil adsorbent rope.

According to a fourth aspect of the invention, there is provided a method of removing oil from the surface of a body of water contaminated with oil in which use is made of a continuous loop of a rope of a material which adsorbs oil in preference to water extending between a desorbing means carried on a moving surface vessel and a rope guide means maintained, in use, at a distance from the vessel, the method comprising the steps of connecting the rope guide means to the vessel with one or more flexible connecting members which allow the rope guide means to undergo pitching and yawing movements relative to the vessel and maintain the rope guide means at a distance from the vessel no greater than a predetermined maximum distance at which the runs of the rope between the rope guide means and the vessel are slack, towing the rope guide means across the said body of water thereby to maintain the rope guide means at or substantially at said maximum distance from the vessel and driving the rope so that successive portions of its length are advanced around the rope guide means to adsorb oil onto its surface and thereafter through the desorbing means to desorb oil from its surface. According to a fifth aspect thereof, the invention provides apparatus intended to be used in carrying into effect a method of oil recovery according to its fourth aspect, the apparatus comprising, in combination, a rope guide means and means for towing it from the surface vessel.

Preferably, the rope guide means adopts a disposition in which it is so offset relative to the vessel that part, at least, of the run of the rope between the rope guide means and the vessel has a component of motion over the surface of the body of water and relative thereto which is transverse to the longitudinal direction of the part.

In an apparatus according to the fifth aspect of the invention, it is convenient to provide four runs of rope, preferably provided as two loops, extending between the rope guide means and the vessel. Preferably, two such apparatuses are provided, one on the port side of the vessel and the other on the starboard side. Preferably, each such apparatus is also in accordance with the second aspect of the invention.

According to one prior proposal, a single loop of oil adsorbent rope is advanced across the surface of the oil contaiminated body of water and through a desorbing means. The present invention can provide in one or other of its aspects, for a number of reasons, rates of oil recovery which are larger than those obtained using this prior proposal. Firstly, the use of barriers in association with the rope guide means can increase the amount of oil or the thickness of the oil film in contact with the rope. Secondly, the use of more than one rope loop increases the surface area of the material of the rope in contact with the oil in the contaminated body of water. Thirdly, the use of rope guide means towed by flexible connecting members to maintain the loop slack allows the use of rope loops of great length, most of which length is floating in the oil contaminated water. Fourthly, the offsetting of the rope guide means from the centre line of the towing vessel can allow the rope to be advantageously positioned in the contaminated water surface. For example, if the movement of the towing vessel through the contaminated body of water is causing two spaced trails of oil to form in its wake then the port and starboard rope guide means can be positioned squarely within the two trails, or outward of the two trails with respect to the vessel, so that their respective rope loops are brought into contact with the oil in the trails.

With all aspects of the present invention, it is preferable to provide as the rope of oil adsorbent material a fibrillated polypropylene material. Suitable desorbing means for such ropes are marketed by Oil Recovery International of Tuckton Bridge, Christchurch, Dorset, England. Preferably, the rope guide means comprises buoyant pulleys arranged so that their axes of rotation are generally vertical.

BRIEF DESCRIPTION OF THE DRAWINGS

Embodiments of oil recovery apparatus according to the present invention will now be described in greater detail, by way of example, with reference being made to the accompanying drawings, in which:

FIG. 3 is an elevational view of part of a barrier which forms part of the apparatus shown in FIG. 1;

FIG. 4 is a view normal to its length of a spreader bar;

DESCRIPTION OF THE PREFERRED EMBODIMENTS

Figure 1:
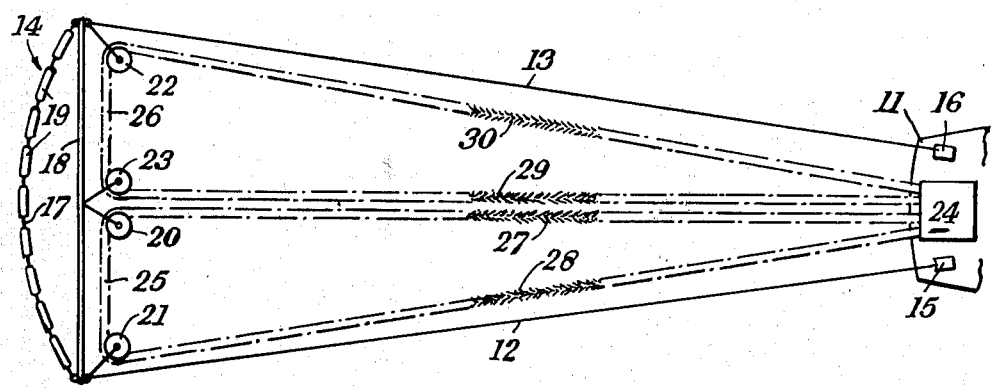
FIGS. 1 and 2 are diagrammatic views from above of first and second embodiments of such apparatus.

In FIG. 1 there is shown the stern of a vessel 11 from which is towed by two tow lines 12 and 13 a barrier indicated generally by reference 14. Tow line 12 is secured to the vessel 11 through a hand winch 15 and tow line 13 is secured to the vessel 11 through a hand winch 16. The provision of these hand winches allows the distance of the barrier 14 behind the vessel and its orientation with respect to the vessel to be adjusted.

The barrier 14 comprises a buoyant boom 17 of plastics material and a tubular spreader bar 18 fabricated from an aluminium alloy. The buoyancy of the boom 17 is provided by a number of buoyancy pockets 19. The construction of the boom is described in greater detail below with reference to FIG. 3 of the drawings. Secured to the spreader bar 18 are four buoyant rope-guide pulleys 20, 21, 22 and 23.

At the stern of the vessel 11, there is mounted on its deck a rope drive and desorbing means 24. This equipment is marketed by Oil Recovery International under the trade name "Barracuda 2000". Extending from the drive and desorbing means 24 are two loops 25 and 26 of oil adsorbent, fibrillated polypropylene rope as mentioned above. Each rope has four strands and a large number of fibrils extending radially outward from the strands to a distance of 15 cm. The rope loop 25 extends from the drive and desorbing means 24 in an outward run 27 around the pulley 20 to the pulley 21 and then back to the desorbing means 24 in an inward run 28. The loop 26 extends from the desorbing means 24 in an outward run 29 to the pulley 23, from there to the pulley 22 and thence back to the desorbing means 24 in an inward run 30.

In operation of the device, the vessel 11 moves forwardly over the body of water on which it floats, towing the barrier 14 behind it. As it approaches an area of the surface of the body of water which is contaminated with oil, the hand winches 15 and 16 are adjusted so as to set the maximum distance between the barrier 14 and the stern of the vessel 11 so that rope loops 25 and 26 are not taut. Upon entering the oil-contaminated area, the drive and desorbing means 24 is actuated to advance the rope loops 25 and 26 along their outward runs 27 and 29, through the area of water in front on the barrier 14 and along their return runs 28 and 30 back to the desorbing means 24. As oil-contaminated water flows past the vessel 11 it collects in the area in front of the barrier 14, is adsorbed on the rope loops 25 and 26 and is carried to the desorbing means 24.

Figure 2:
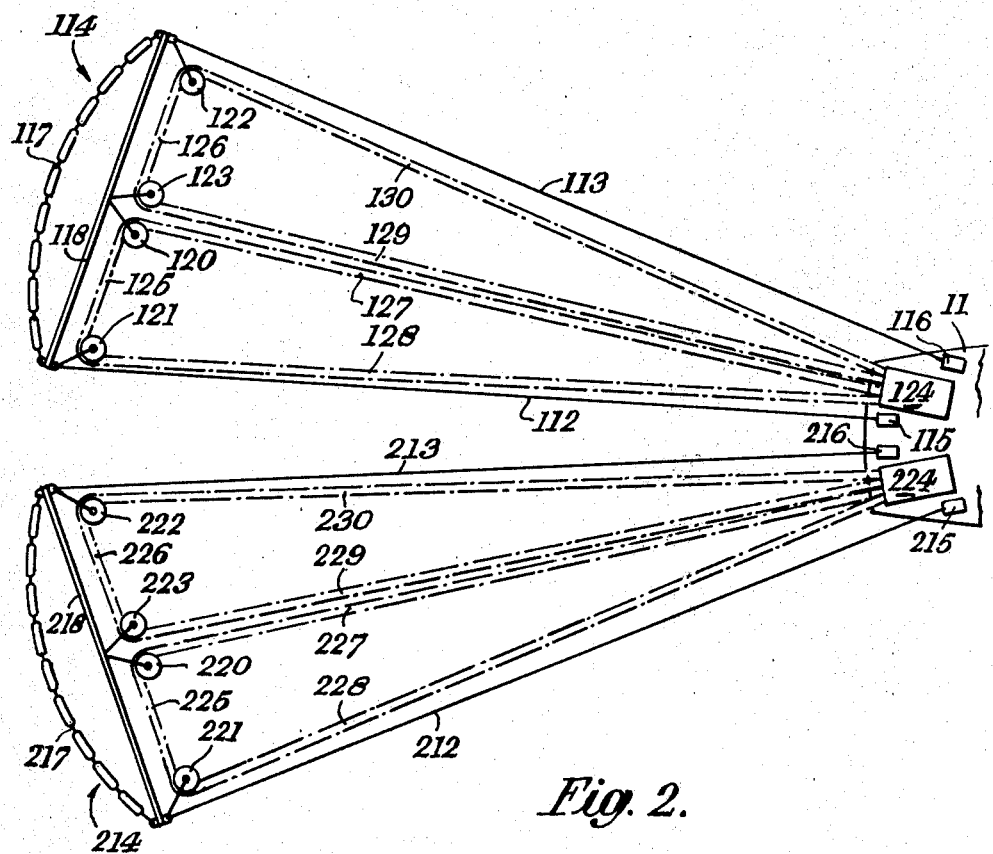

Turning now to FIG. 2 of the drawings, the embodiment shown differs from that of FIG. 1 in that the vessel 11 carries two desorbing means and two towed barriers. In other respects, the apparatus shown is similar to that described above with reference to FIG. 1. Accordingly, the apparatus shown in FIG. 2 and associated with the port side of the vessel is identified with reference numerals corresponding to those used with reference to FIG. 1 but with the addition of the prefix numeral 1. Similarly, the apparatus associated with the starboard side of the vessel 11 is identified by reference numerals corresponding to those used in FIG. 1 but having the prefix numeral 2.

In operation of the apparatus shown in FIG. 2, the barriers 114 and 214 are positioned so as best to collect the oil in the two trails which are formed on either side of the boat in its wake as it moves through the contaminated water. The degree to which each barrier remains offset with respect to the centre line of the boat can be controlled by adjustment of the lengths of the tow lines by use of the hand winches on the deck of the towing vessel 11. Thus, in FIG. 2, if it is desired to offset both barriers further from the centre line, that is to say to "fly" them further outwardly from the sides of the vessel, then their respective outer tow lines 113 and 212 are shortened. On the other hand, if it is desired to bring the two barriers together behind the stern of the vessel 11, then the lengths of their inner tow lines 112 and 213 are reduced relative to lengths of their outer tow lines.

Figure 6:
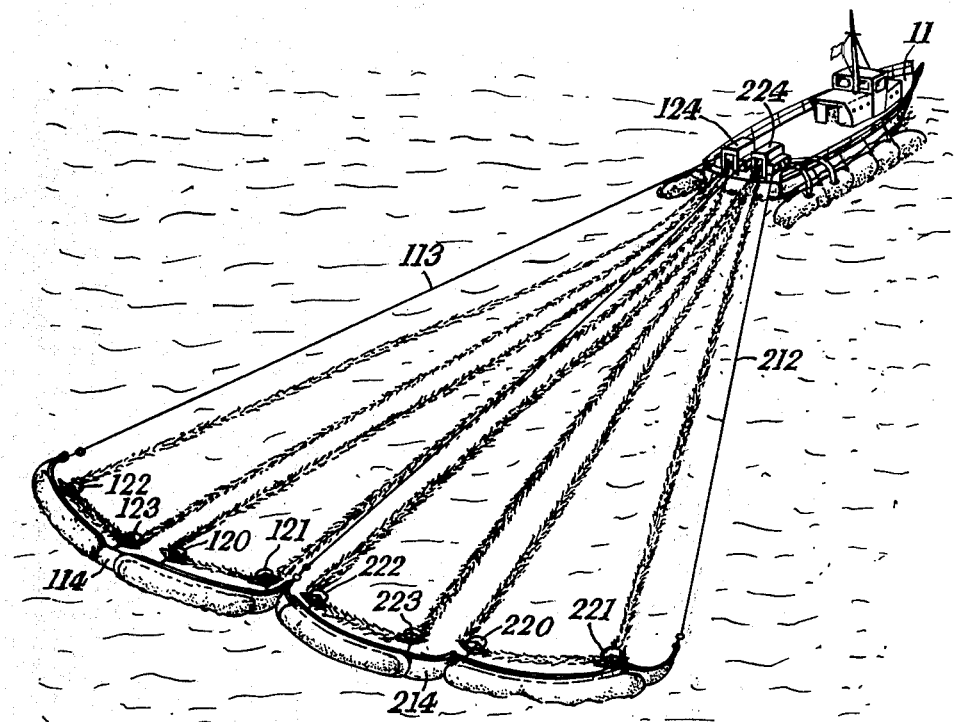
FIG. 6 is a photographic illustration of a third embodiment of such apparatus.

In the embodiments of both FIG. 1 and FIG. 2, the collected oil which will be provided as an output from the desorbing means 24, 124 and 224 may be stored within the vessel 11 or, preferably, may be discharged into flexible, buoyant, tubular storage tanks secured alongside the vessel 11 while they are being filled with recovered oil. These tanks can readily be detached from the vessel 11 when they are full for towing away to onshore treatment plants. Examples of such tanks are shown in FIG. 6.

Turning now to FIG. 3, there is shown an end portion of the tow line 13 shown in FIG. 1 and an end portion of the plastics boom 17. The boom 17 terminates at each end with a plate 39 of aluminium alloy to which is connected a shackle 40. The shackle 40 is connected to the spreader bar 18 which is in turn connected to a shackle 41, itself connected to the tow line 13. The shackle 40 can be connected to the plate 39 by one of a number of alternative holes 42 to provide some control over the attitude which the boom adopts in the water.

The boom 17 is fabricated from a polyvinyl chloride/polyester plastics material and includes nine buoyancy pockets 19, each one of which contains a cylindrical block of expanded polystyrene. A continuous pocket 43 extending along the top of the boom 17 contains a polypropylene rope secured to the end plates 39 and a similar continuous pocket 44 at the base of the boom contains a galvanized chain 45 connecting the end plates 39. In use, the boom 17 extends downwardly into the body of water being treated to a distance of approximately 30 cm. Each cylindrical, polystyrene block has a diameter of 22 cm. and a length of a little less than 1 m. Generally, it will be convenient to set the maximum distance at which the barrier 14 is towed behind the towing vessel at about 30 to 35 m. for the embodiments described in FIGS. 1 and 2.

FIG. 4 shows a spreader bar which is telescopic and which has lugs at both ends for the attachment of tow lines and a boom.

Figure 5:
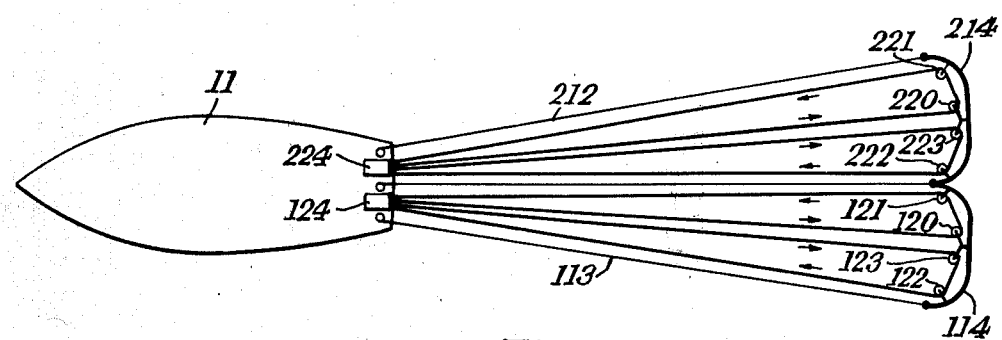
FIG. 5 is a view from above.

FIGS. 5 and 6 show oil recovery apparatus similar to that shown in FIG. 2 and like reference numerals identify similar components of the apparatus. The barriers 114 and 214 do not include spreader bars, the rope-guide pulleys 120, 121, 122, 123, 220, 221, 222 and 223 being connected directly to plates interposed between the buoyancy pockets of the barriers.

Figure 7:
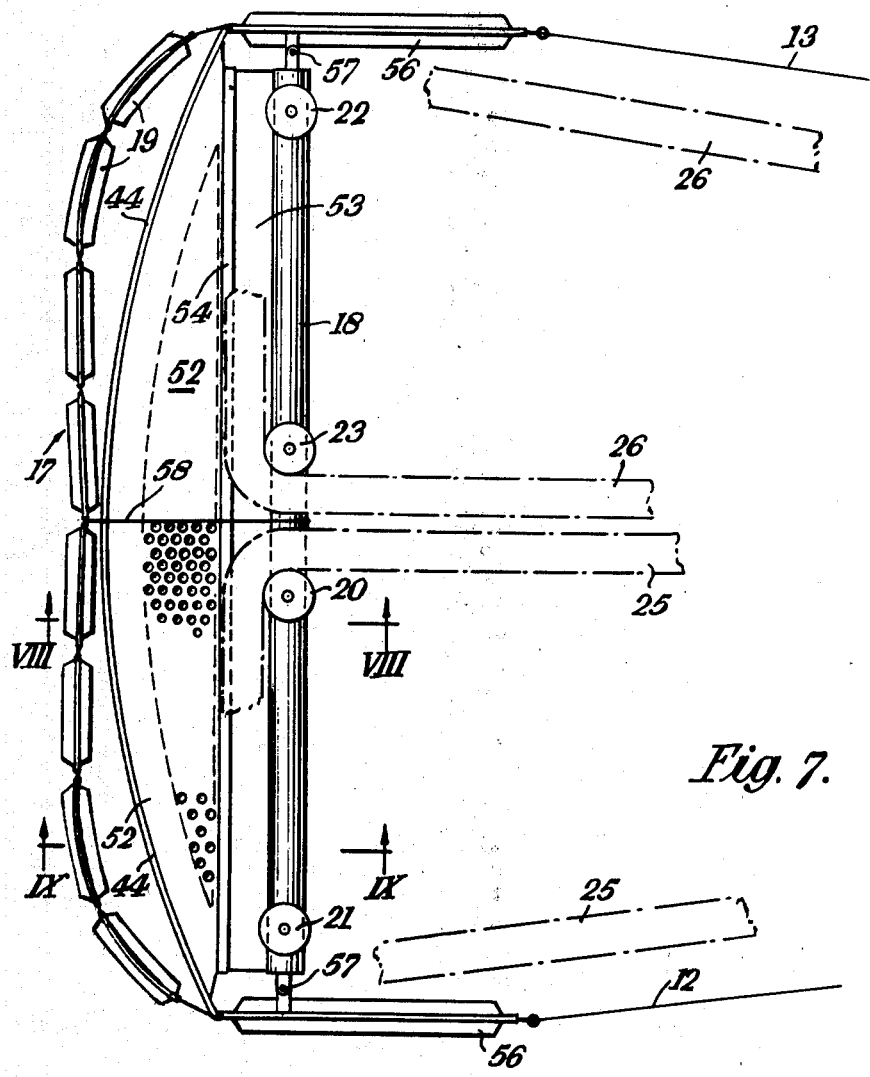
FIGS. 7, 8 and 9 show a fourth embodiment of an apparatus according to the invention, FIG. 7 being a view from above, FIG. 8 being a section through the rope guide pulley 23 at VIII—VIII in FIG. 7 and FIG. 9 being a section through IX—IX in FIG. 7.
Figure 8:
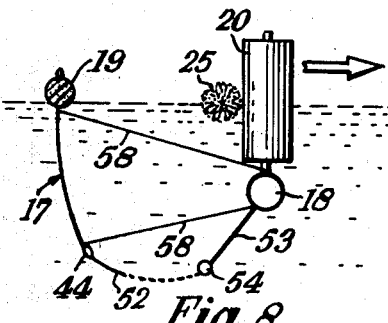
Figure 9:
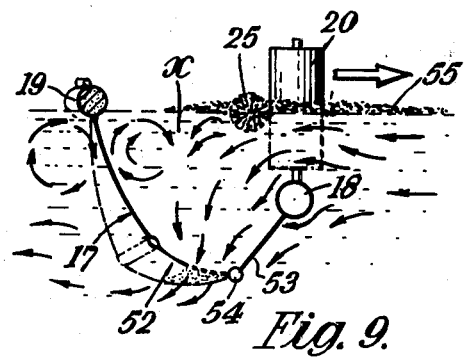

In the embodiment of FIGS. 7, 8 and 9 many of the components correspond with like-numbered components in the embodiment of FIG. 1. The FIG. 7 device is however, provided with a forward skirt 53 attached to the spreader bar 18 and a perforated lower skirt 52 connected by a strut 54 to the forward skirt and to the boom 17 at its lower edge. The lower edge 44 of the boom 17 is ballasted. Oil 55 is confined within the area ahead of the boom 17 by buoyant side cheeks 56 connected at 57 for movement about a vertical pivotal axis to a spreader bar 18 which has at its ends brackets of suitable form to effect the connection. The side cheeks are found to improve the stability of the boom in use. Between the centre of the spreader bar 18 and the boom 17 is fitted a rope tie 58 which serves to maintain the boom 17 a predetermined distance away from the spreader bar. The distance is chosen with the aim of establishing a zone of stagnation (indicated generally by lead line x in FIG. 9) just behind each of the rope mops 25 and 26 where the reverse flow of water immediately in front of the boom 17 meets the downward flow of water over the bar 18, as shown by the pattern of arrows in FIG. 9. Factors which influence the position of the zone of stagnation include the depth at which the bar 18 lies beneath the water surface, the speed at which the barrier 14 moves through the water and the proportion of the total skirt area which is pervious. The buoyant side cheeks 56 are useful in this regard because they help to maintain constant the depth at which the spreader bar 18 lies beneath the water surface.

In use of the FIG. 7 device, water flows around the barrier and through the perforated skirt as shown in FIG. 9. Oil 55 accumulates in front of the boom 17 where it may be adsorbed onto the rope mops 25 and 26.

The invention being thus described, it will obvious that the same may be varied in many ways. Such variations are not to be regarded as a departure from the spirit and scope of the present invention, and all such modifications as would be obvious to one skilled in the art are intended to be included within the scope of the following claims.

I claim:

1. An apparatus for use in removing oil from the surface of a body of water contaminated with oil comprising:
   a. a barrier comprising a boom with a front face, a rear face and a buoyant upper edge region, a spreader bar extending along the front face of the boom and serving to support opposed ends of the boom, and a water-pervious skirt having opposed upper and lower edges, the said upper edge being secured to said buoyant upper edge region and the said lower edge being secured to said spreader bar;
   b. oil removal apparatus secured to the spreader bar for removing oil from the surface of the water body in which the barrier is buoyant, in the region of the spreader bar; and
   c. means for securing a movement of the barrier relative to the body of water in which the barrier is buoyant, thereby causing oil to accumulate ahead of the barrier for removal from the water body by the oil removal apparatus.

2. The apparatus as claimed in claim 1, wherein the oil removal apparatus includes at least two buoyant guide pulleys at spaced locations along the spreader bar, the pulleys being adapted to guide a continuous loop of an oil-absorbent rope, whereby the rope may be advanced around a circuit which includes a rope drive and oil desorbing means and a run extending between the said guide pulleys.

3. The apparatus as claimed in claim 2 comprising two pairs of guide pulleys secured to the spreader bar, a first pair comprising a first end pulley adjacent one end of the spreader bar and a first center pulley adjacent a midpoint of the spreader bar, and a second pair comprising a second end pulley adjacent the other end of the spreader bar and a second center pulley adjacent the midpoint of the spreader bar, whereby a first said rope loop may be guided around the first pair of pulleys and a second rope loop may be guided around the second pair of pulleys.

4. The apparatus as claimed in claim 2, wherein the means for securing a movement of the barrier relative to the body of water comprises a surface vessel and means for towing the barrier from the vessel.

5. The apparatus as claimed in claim 4 comprising an oil desorbing and rope drive means carried on the surface vessel, for advancing said rope around said circuit and removing from the rope at the vessel oil adsorbed onto the rope in the region of the barrier.

6. The apparatus as claimed in claim 1, wherein the boom is made of a flexible material, and the spreader bar and the boom are connected at a point intermediate their ends by a flexible tie to maintain the distance between the boom and the spreader bar at said point equal to or less than a predetermined distance.

7. The apparatus as claimed in claim 1, wherein the boom includes a buoyant side cheek at each end of the spreader bar for assisting in maintaining constant the depth of the spreader bar in the said body of water.

8. The apparatus as claimed in claim 7, wherein the buoyant side cheeks are connected to the spreader bar by a connection which allows pivotal movement about a vertical axis.

9. An apparatus for the recovery of oil from the surface of oil-contaminated water which comprises:

(a) a barrier means comprising
- a boom having a front and rear face provided with a buoyant upper edge, and a ballasted lower edge,
- a spreader bar positioned in front of and extending along the front face of said boom, attached to and serving to support said boom, at its respective ends,
- a water-pervious skirt comprising a forward skirt having an upper and lower edge and a perforated lower skirt having a front and rear edge, said forward skirt being attached along its upper edge to said spreader bar and along its lower edge via a strut to said lower skirt along its front edge, said rear edge of said lower skirt being attached to said lower edge of said boom, and (b) an oil removal means closely associated with said spreader bar for the removal of oil from the surface of said oil-contaminated water in the region of said spreader bar.

10. The apparatus of claim 9, wherein said oil removal means includes at least one continuous loop of an oil-absorbent means and at least two buoyant guide pulleys secured to said spreader spaced one from the other so as to direct said oil-absorbent means through the oil-contaminated water collected in front of the front face of said boom.

11. The apparatus of claim 10, wherein said oil removal means includes two continuous loops of an oil-absorbent means and two pairs of guide pulleys secured to said spreader bar, a first pair comprising a first end pulley adjacent a first end of said spreader bar and a first center pulley positioned so as to be displaced to the side of the midpoint of said spreader bar in the direction of said first end, and a second pair comprising a second end pulley adjacent a second end of said spreader bar and a second center pulley positioned so as to be displaced to the side of the midpoint of said spreader bar in the direction of said second end of said spreader bar, whereby a first continuous loop of an oil-absorbent means is guided around said first pair of pulleys and a second continuous loop of an oil-absorbent means is guided around said second pair of pulleys, said first and second center pulleys being displaced from the midpoint of said spreader such that said first and second oil-absorbent means freely pass around said center pulleys.

12. The apparatus of claim 9, wherein said boom is made of a flexible material and a flexible tie means is fitted between the center of said spreader bar and said boom which serves to maintain said boom at a predetermined distance from said spreader bar.

13. The apparatus of claim 9, wherein said boom includes a buoyant side cheek means positioned at each of said first and second ends of said spreader bar for assisting in maintaining constant the depth of said spreader bar in said oil-contaminated water.

14. The apparatus of claim 13, wherein said buoyant side cheek means are connected to said spreader bar by a connection which allows for pivotal movement about a vertical axis.

* * * * *